United States Patent [19]
Porter

[11] Patent Number: 4,823,405
[45] Date of Patent: Apr. 25, 1989

[54] BABY SAFETY BAG

[76] Inventor: E. Ilene Porter, 4729 S. 200 West, County of Weber, Ogden, Utah 84403

[21] Appl. No.: 221,883

[22] Filed: Jul. 20, 1988

[51] Int. Cl.$^4$ ............................................ A41D 11/00
[52] U.S. Cl. ............................................................ 2/80
[58] Field of Search ...................... 2/69.5, 80; 119/96; 280/47.38, 650; 297/254, 255, 274, 275

[56] References Cited
U.S. PATENT DOCUMENTS 2,563,161 8/1951 Dixon ............................................ 2/80
2,707,988 5/1955 Shaub ...................................... 2/69.5

Primary Examiner—Steven N. Meyers
Assistant Examiner—D. Biefeld
Attorney, Agent, or Firm—A. Ray Osburn

[57] ABSTRACT

A baby safety and warmth bag for use in conjunction with automobile baby seats, having a torso portion and a pair of leg encasing tubular portions, along with a back portion extending upwardly from the torso. The back portion carries clearance slits to permit use of automobile baby seat shoulder straps to secure the bag and contained baby within the seat. The bag is also provided with a pair of side loops for use with automobile seat belts, to secure the bag and infant directly to automobile seats. Further, a pair of openings is provided through the back portion spaced for the seat belt of a stroller. The bag may also be advantageously used with infant backpacks.

8 Claims, 3 Drawing Sheets

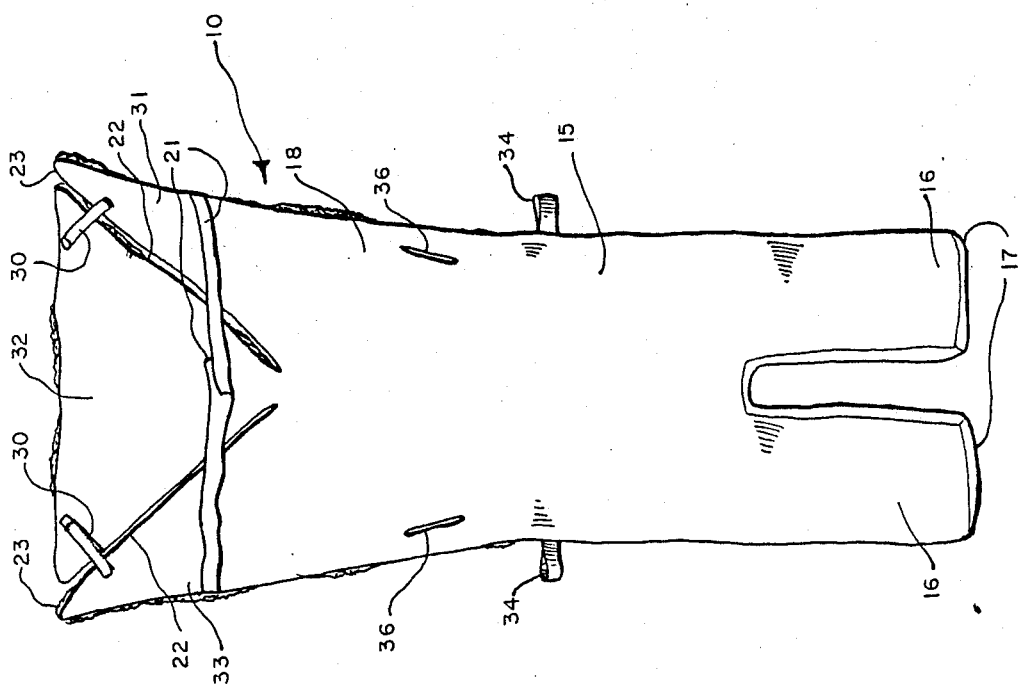
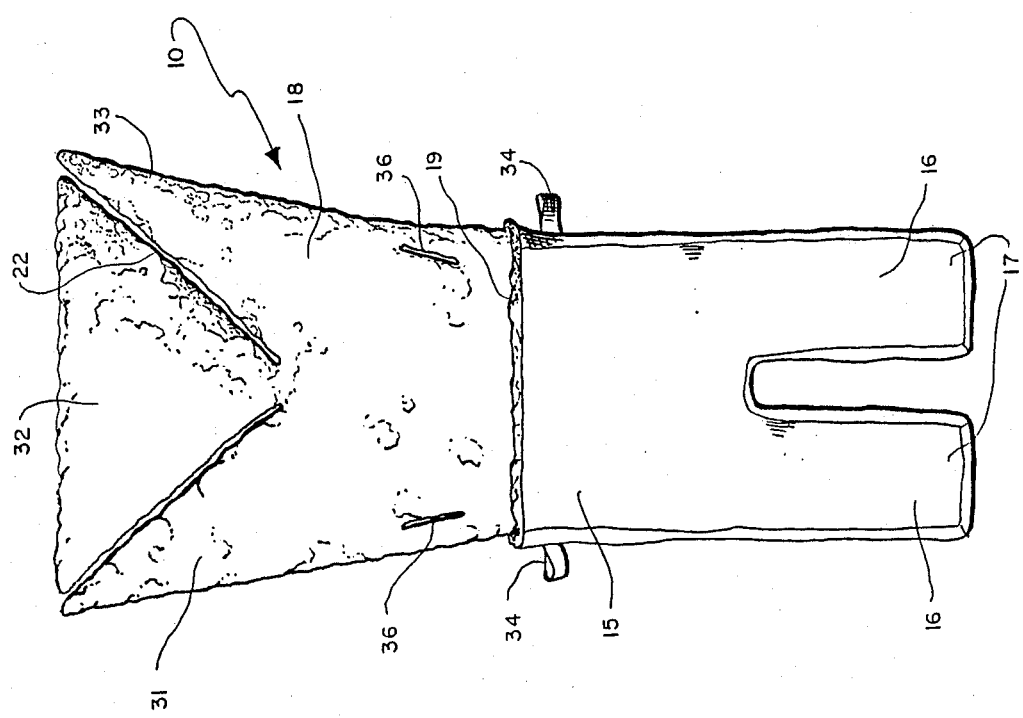

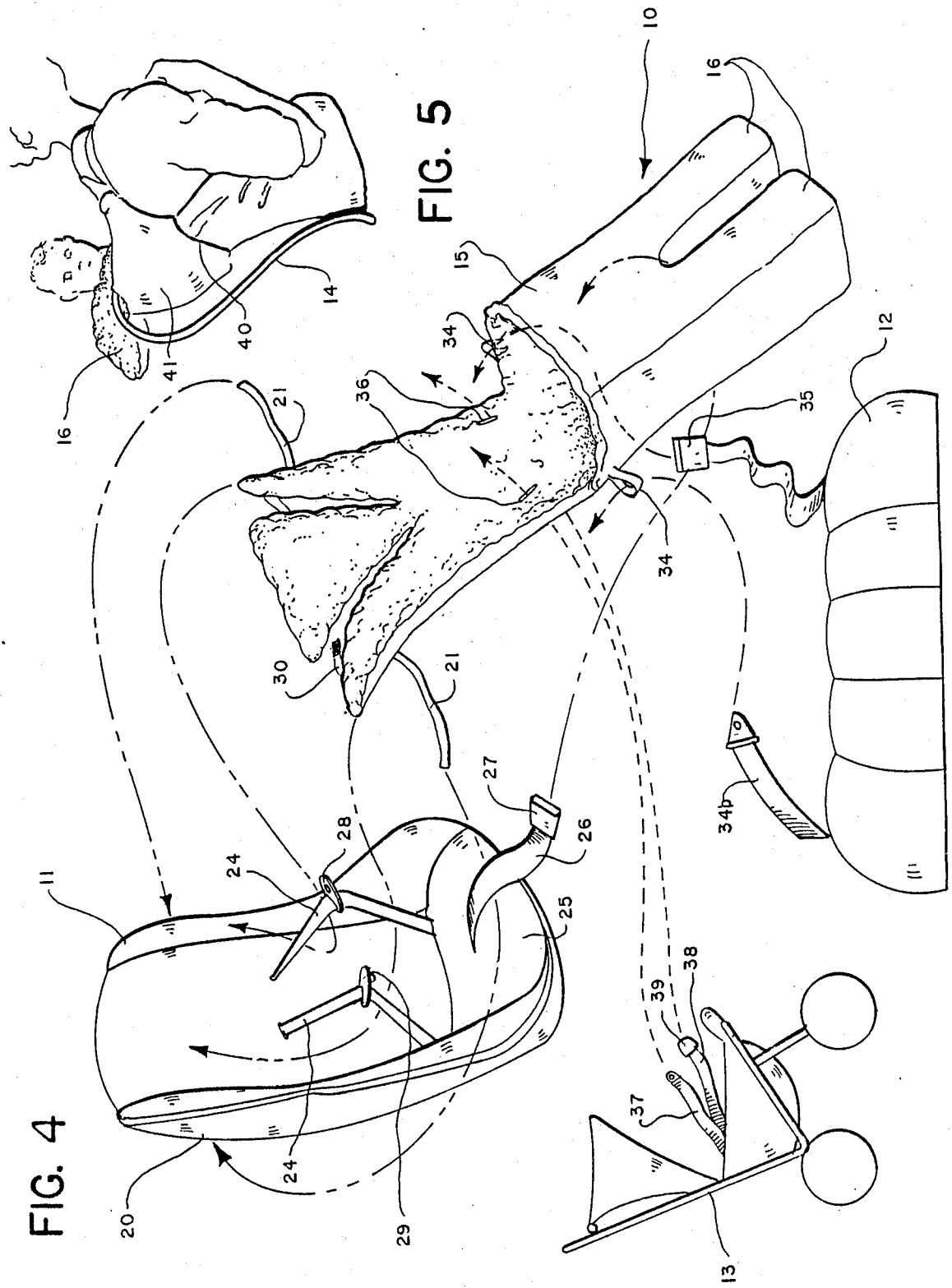

BABY SAFETY BAG

BACKGROUND OF THE INVENTION

1. Field:

The field of the invention is infant care accessories and more particularly those associated with automobile safety seats, strollers, infant carrying back packs, and the like.

2. State of the Art:

The transport and carrying of children of pre-ambulatory age has spawned a variety of devices to ease the burdens of the mother or other attending person. Infant car seats, perambulators (prams), strollers, and even back packs are commonly used. All are designed to relieve the attendant of the strain of holding the infant in arms, or upon laps, for extended periods. All of these devices except the pram provide for infant restraint and retention, infant encircling straps being commonly used. The back pack provides a baby holding pouch with a pair of leg openings. To provide for the warmth of the preambulatory infant, blankets, quilts and the like are usually commonly employed. The restraining straps interfere with the blankets, rendering it difficult to adequately cover both the trunk and the limbs of the infant. The blanket wads in the crotch areas of both back packs and car seats, for example. Covering the infant by covering the entire car seat is also generally futile because the infant can kick or throw the blanket aside. Notwithstanding these difficulties, reliance at the present time, to the inventor's knowledge, is entirely upon such blankets or quilts. The prior art does not include any adequate solution to covering pre-ambulatory infants for warmth when car seats and the like are utilized.

BRIEF SUMMARY OF THE INVENTION

With the foregoing in mind, the disadvantages and shortcomings of the prior art are eliminated or substantially alleviated in the present invention, which provides trouble free covering of both the legs and trunk of infants in car seats and the like. The invention comprises an infant covering bag divided at its lower end into a pair of feet and leg receiving, closed-end tubes. Car seat crotch, waist and shoulder straps may be employed unimpeded with the bag without uncomfortable wadding or uncovering of any part of the infant. The front of the bag extends upwardly from the leg tubes generally to the infant's chest. The rear portion preferably reaches above the infant's head. To allow the use of the car seat shoulder straps, the upper portion is slotted for clearance. A pair of tie straps are attached to a back portion of the bag to secure it to the back rest of the car seat, stroller or the like.

For occasional use of the bag directly upon the automobile seat, a pair of loops are attached, one on each side of the rear of the bag above the front portion. The straps of the automobile seat belt may be threaded through the loops and fastened together to retain the bag and infant. To accommodate the more closely spaced seat belts of strollers, a pair of vertical slits are provided through the upwardly extending rear of the bag. The aforementioned upper straps may also be fastened around the back of the stroller.

It is, therefore, the object of the invention to provide a reliable, easily used, warming covering for infants in automobile baby car seats, strollers, and infant back pack devices.

BRIEF DESCRIPTION OF THE DRAWINGS

In the drawings, which represent the best mode currently contemplated for carrying out the invention.

DETAILED DESCRIPTION OF ILLUSTRATED EMBODIMENTS

Figure 1:
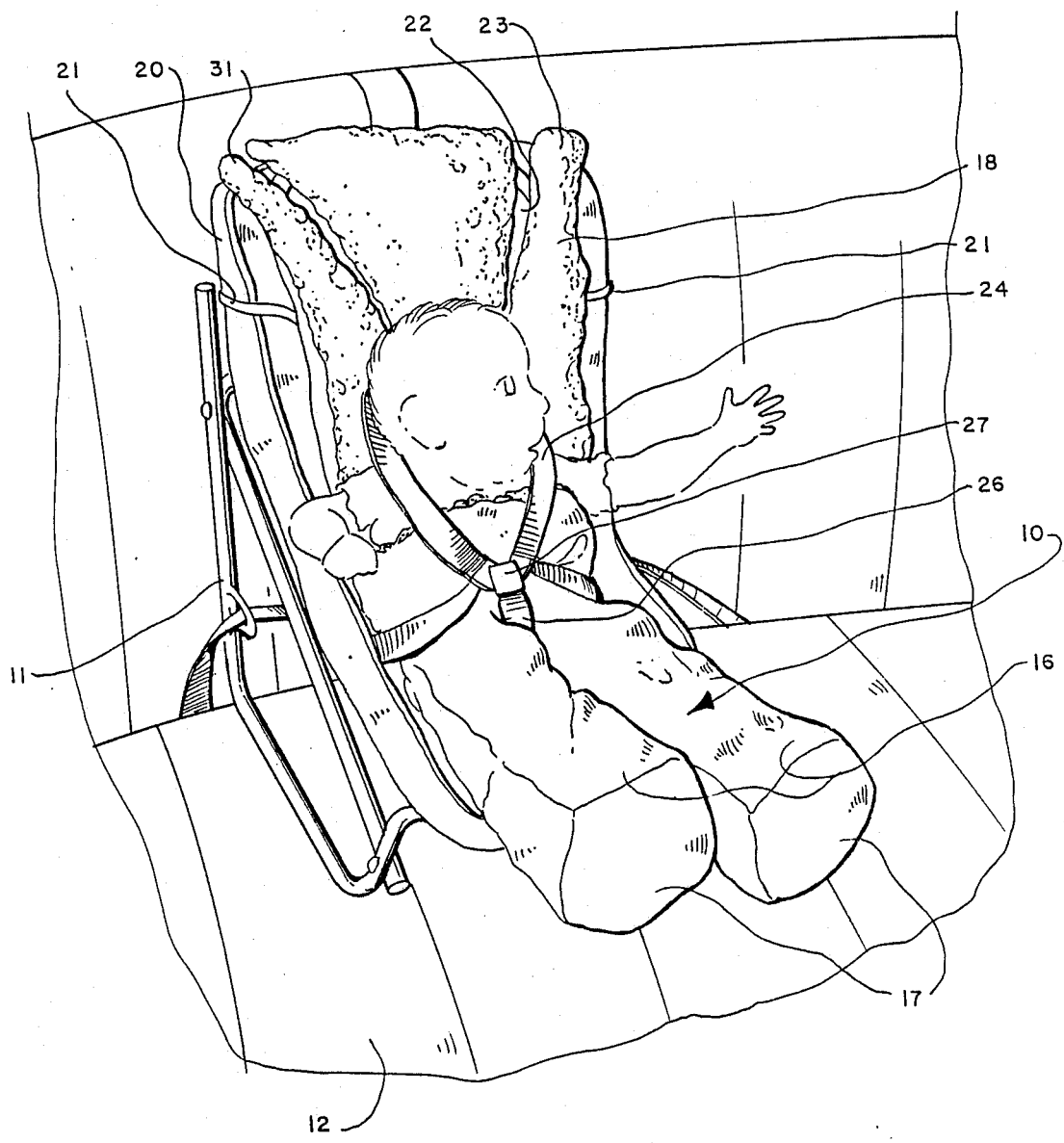
FIG. 1 is a perspective view of a baby safety bag in accordance with the invention illustrated in use in conjunction with an automobile baby seat, drawn to a reduced scale, FIG. 2 a front elevation view of the bag of FIG. 1 drawn to approximately the same scale, FIG. 3 a rear elevation view of the bag of FIG. 2, drawn to the same scale, FIG. 4 a perspective view of the bag of FIG. 1 in conjunction with views of the automobile baby seat of FIG. 1, a baby stroller, and a portion of an automobile seat with associated seatbelt, said bag being shown in separated relationship with associated arrows indicating the mode of installation of the bag upon said automobile seat, stroller, and automobile baby seat, drawn to approximately the scale of FIG. 1, and FIG. 5 a side view of the baby safety bag of FIG. 1 shown in use in conjunction with an infant backpack, drawn to a smaller scale than FIG. 1.

Baby safety bag 10 is illustrated for use in conjunction with an automobile infant seat 11 in FIG. 1 and again in FIG. 4, which also shows how bag 10 may be secured directly upon an automobile seat 12, and to the seat of an infant stroller 13. The use of bag 10 with an infant back pack carrier 14 is shown in FIG. 5.

Baby bag 10 comprises a trunk covering portion 15, and a pair of downwardly extending tubular leg-encasing members 16, each preferably closed at its bottom end 17. (FIG. 2 and 3) The trunk 15 encases the infant to its chest or shoulders, its arms preferably being left free. The upper back portion 18 above the top of trunk 15 is adapted to be secured to either the automobile infant seat 11, the passenger seat 12 of a car, or the stroller 13.

Upper rear portion 18 of bag 10 is preferably tapered upwardly and outwardly from the top edge 19 of trunk 15, to be wide enough to be easily secured to back member 20 of automobile seat 12. A pair of tie straps 21 are each secured to an edge of back portion 18, and may be fastened around infant seat back 20. A pair of diagonal slits 22 extend from each topmost corner 23 of back 18, and are positioned to allow the use of the shoulder safety straps 24 typically provided in infant car seats. The shoulder belts 24 extend through slits 22, pass over the shoulders of the infant and continue on the front outside of bag 10 to attachment points near the junction of back 20 and seat 25. (FIGS. 1 and 4) Crotch belt 26 passes upwardly between leg tubes 16 to connect by a snap buckle 27 to connectors 28 and 29 on straps 24. Releasable fasteners such as the Velcro patches 30 secure the flaps 31, 32, and 33 created by the slits 22 together.

Bag 10 may be used directly upon automobile seat cushion 12 (FIG. 4). In this event, the automobile seat lap belt 34 retains the child in bag 10 upon seat 12. A pair of seat belt loops 34 are provided secured to back 18 of bag 10, preferably slightly below the top 19 of trunk 15. Automobile seat belt 34 is installed through loops 34, and is then secured together by buckle 35 about trunk 15 and the infant.

For use of baby safety bag 10 with a stroller 13, a pair of vertical belt holes 36 are provided in back portion 18 slightly above the top edge 19 of trunk 15. Belt holes 36 are spaced the correct distance apart to accomodate the two seat straps 37 of stroller safety belt 38. Straps 37 are each threaded through one of the holes 36 with their ends then secured together by buckle 39 about bag 10 to retain it and the infant within stroller 13. The front portion of trunk 15 may be pulled upwardly to avoid contact of stroller belt 38 with the infant's body. As with the car seat use, straps 21 may be used o secure baby bag 10 to the back of stroller 13.

Baby bag 10 may also be readily used with an infant back pack 14 (FIG. 5). With this use, leg tubes 16 each extend through the leg holes 40 provided in the seat pouch 41. No special fastening is required with this use, there being little possibility of the infant falling from the back pack pouch. Upper back portion 18 of bag 10 folds out of the way over the rear of the back pack. Or, flaps 31, 32, and 33 may be fastened in folded position forwardly over the infant's head for warmth and protection. (Not illustrated)

Trunk 15 and leg tubes 16 are preferably generously sized for loose, roomy, uncramping use of bag 10 with variously clothed and various sized infants. Bag 10 is preferably constructed of suitable warmth retaining material such as natural or artificial wool or the like.

The invention may be embodied in other specific forms without departing from the spirit or essential characteristics thereof. The present embodiments are therefore to be considered as illustrative and not restrictive, the scope of the invention being indicated by the appended claims rather than by the foregoing description, and all changes that come within the meaning and range of equivalency of the claims are therefore intended to be embraced therein.

What is claimed and desired to be protected by United States Letters Patent is:

1. A baby safety and warmth bag of flexible fabric for use with automobile baby seats having shoulder and crotch strap means for securing an infant therein, said bag comprising:
   an elongate tubular portion sized to enclose therein the torso of an infant from its crotch to its upper chest, said torso portion having front, back, left and right side portions;
   a pair of parallel elongate tubular members joined with and extending downwardly from the crotch end of the torso tube, each sized to enclose a leg of the infant;
   a back portion secured to and extending upwardly from the top edge of the back side portion of the torso tube, said back portion being configured to permit use of the strap means to retain the bag and contained infant within the automobile baby seat wherein the upwardly extending back portion comprises a pair of slits providing clearance for the shoulder straps, said slits each extending to an edge of said back portion.

2. The baby bag of claim 1, further comprising:
   strap means carried by the back portion of the bag, sized to gird the back of the automobile baby seat to fasten the bag to said seat.

3. The baby bag of claim 1, further comprising:
   a pair of loops carried at each side of the torso portion, sized and positioned to accept the straps of an automobile seat belt therethrough, so that said belt may be used to hold the bag and contained infant safely directly upon the automobile seat.

4. The baby bag of claim 1, further comprising:
   a pair of openings through the upwardly extending back portion of the bag, spaced apart and sized to permit the straps of a seat belt of a baby stroller to pass therethrough, so that said belt may be used to hold the bag and contained infant safely within the seat of the stroller.

5. The baby bag of claim 3, further comprising:
   a pair of openings through the upwardly extending back portion of the bag, spaced apart and sized to permit the straps of a seat belt of a baby stroller to pass therethrough, so that said belt may be used to hold the bag and contained infant safely within the seat of the stroller.

6. The baby bag of claim 5, further comprising:
   strap means carried by the back portion of the bag, sized to gird the back of the automobile baby seat to fasten the bag to said seat; and releasable fastening means securing the strap clearance strips together.

7. The baby bag of claim 3, wherein:
   the torso and leg tubes are sized to comfortably accomodate a fully clothed and shod infant.

8. The baby bag of claim 6, wherein:
   the torso and leg tubes are sized to comfortably accomodate a fully clothed and shod infant.

* * * * *